United States Patent
Andry

(10) Patent No.: US 12,533,325 B2
(45) Date of Patent: Jan. 27, 2026

(54) COMPOSITION AND METHOD FOR PREVENTING OR TREATING OPIOID WITHDRAWAL SYMPTOMS

(71) Applicant: Jonathan B. Andry, New Orleans, LA (US)

(72) Inventor: Jonathan B. Andry, New Orleans, LA (US)

( * ) Notice: Subject to any disclaimer, the term of this patent is extended or adjusted under 35 U.S.C. 154(b) by 393 days.

(21) Appl. No.: 18/094,156

(22) Filed: Jan. 6, 2023

(65) Prior Publication Data

US 2024/0226031 A1 Jul. 11, 2024

(51) Int. Cl.

| | | |
|---|---|---|
| A61K 31/05 | (2006.01) | |
| A61K 31/197 | (2006.01) | |
| A61K 31/198 | (2006.01) | |
| A61K 31/405 | (2006.01) | |
| A61K 31/7004 | (2006.01) | |
| A61K 31/714 | (2006.01) | |
| A61K 33/00 | (2006.01) | |
| A61K 33/06 | (2006.01) | |
| A61K 36/185 | (2006.01) | |
| A61K 36/82 | (2006.01) | |
| A61K 36/9066 | (2006.01) | |
| A61K 45/06 | (2006.01) | |

(52) U.S. Cl.
CPC ............ *A61K 31/05* (2013.01); *A61K 31/197* (2013.01); *A61K 31/198* (2013.01); *A61K 31/405* (2013.01); *A61K 31/7004* (2013.01); *A61K 31/714* (2013.01); *A61K 33/00* (2013.01); *A61K 33/06* (2013.01); *A61K 36/185* (2013.01); *A61K 36/82* (2013.01); *A61K 36/9066* (2013.01); *A61K 45/06* (2013.01)

(58) Field of Classification Search
CPC .... A61K 31/05; A61K 31/197; A61K 31/198; A61K 31/405; A61K 31/7004; A61K 31/714; A61K 33/00; A61K 33/06; A61K 36/185; A61K 36/82; A61K 36/9066; A61K 45/06
See application file for complete search history.

(56) References Cited

U.S. PATENT DOCUMENTS

| | | | | |
|---|---|---|---|---|
| 10,966,938 | B2 * | 4/2021 | Andry | A61K 36/889 |
| 2021/0401736 | A1 * | 12/2021 | Wan | A61K 47/10 |
| 2022/0257561 | A1 * | 8/2022 | Tejani | A61K 31/198 |
| 2023/0233466 | A1 * | 7/2023 | Sloat | A61K 31/685 |
| | | | | 424/450 |
| 2024/0041782 | A1 * | 2/2024 | Ogburn | A61K 31/352 |
| 2024/0082270 | A1 * | 3/2024 | Elzufon | A61K 36/068 |

* cited by examiner

*Primary Examiner* — Frederick F Krass
*Assistant Examiner* — Toriana N. Vigil
(74) *Attorney, Agent, or Firm* — Intellectual Property Consulting, LLC; Jared K. Rovira

(57) ABSTRACT

A composition which provides a comprehensive solution for curbing, moderating and/or reducing the symptoms and cravings of opioid withdrawal syndrome. The composition is provided in the form of a capsule, pill, liquid, powder for mixing, or patch. In accordance with embodiments of the invention a composition for treating opioid withdrawal syndrome is provided. The composition includes (i) a therapeutically effective amount of a functional blend comprising a mixture of cannabidiol, cannabigerol, gamma aminobutyric acid, Inositol, and Vitamin B-12; (ii) a therapeutically effective amount of a hydration blend comprising a mixture of calcium, magnesium, potassium citrate, and L-glutamine; (iii) a therapeutically effective amount of an anti-inflammatory blend comprising a mixture of turmeric, green tea, and passion fruit; and (iv) a therapeutically effective amount of a neurotransmitter blend comprising 5-hydroxy-L-Tryptophan, N-acetyl L-Tyrosine, and L-Phenylalanine. The composition is consummate addition to a complete opioid cessation and withdrawal program because it targets, moderates, curbs and/or ameliorates the deleterious symptoms of opioid cessation and withdrawal. The composition is consummate addition to a complete opioid cessation and withdrawal program because it targets, moderates, curbs and/or ameliorates the potentially incessant drug cravings and the associated anxiety and stress.

20 Claims, No Drawings

COMPOSITION AND METHOD FOR PREVENTING OR TREATING OPIOID WITHDRAWAL SYMPTOMS

BACKGROUND OF THE INVENTION

I. Field of the Invention

The present invention relates generally to compositions and methods of addressing and curbing opioid withdrawal syndrome. The present invention is operable to be an adjunct to a professional and comprehensive program for opioid cessation and detoxification.

III. General Background

Opioids are a group of drugs that are prescribed to manage severe pain and include morphine, heroin, oxycontin, codeine, methadone, and hydromorphone. They produce mental relaxation, pain relief, and euphoric feelings.

Opioids are complex drugs that are highly addictive. The drugs work by entering the bloodstream and traveling to the brain where they attach themselves to opioid receptors. This causes the individual to feel less pain and also triggers the release of dopamine. Dopamine, a neurotransmitter, is responsible for rewarding and reinforcing actions that cause us pleasure. It also suppresses another neurotransmitter, noradrenaline, which produces feelings of energy and alertness.

As more of the opioid is used, the dopamine levels in the brain increase while the noradrenaline levels decrease. Users may feel tired and sleepy during use but depressed when the drug is not available. The brain begins to consider the high dopamine levels to be normal when in the presence of opioids. Without the opioids, dopamine levels are extremely low.

The more opioids are consumed, the more the brain adapts to their use. Over time, it requires more opiates than it did initially to produce the same amount of dopamine. This means that the individual must consume more to get the same feeling.

With prolonged use, pain-relieving effects may lessen, and pain can become worse. When an opioid drug is used on prolonged basis, the user's brain adjusts so the effects of the same amount of the drug become less over time. The user then will need larger amounts of the drug to get the same effect or "high" and/or experience reduced effects when taking the same amount of the opioid. This phenomenon, often, perpetuates into an incapacitating form of dependence in users where the user also must take the drug to feel normal. At this juncture, the individual has developed a tolerance and is physically dependent or addicted to opioids.

The addiction and dependence on opioids, is known as Opioid Use Disorder (OUD). Symptoms of OUD include, but are not limited to, appetite loss and changes in eating patterns, depression, insomnia, nausea, opioid abuse, dependence, and withdrawal, opioid dependence in remission, and weight loss.

Chronic opioid use has led to the development of potentially incapacitating dependence for millions of Americans. Opioid addiction has become reached pandemic proportions. Indeed, OUD currently afflicts more than three million US citizens and, may and, often, does result in the user's death from an overdose. Tragically, drug overdose deaths have reached a historic high, devastating families and communities. More than 760,000 people have died since 1999 from a drug overdose. Indeed, two out of three drug overdose deaths in 2018 involved an opioid. In 2017, more than 70,000 people died from drug overdoses, making it a leading cause of injury-related death in the United States. Provisional data from CDC's National Center for Health Statistics indicate that there were an estimated 100,306 drug overdose deaths in the United States during 12-month period ending in April 2021, an increase of 28.5% from the 78,056 deaths during the same period the year before. On average, 130 Americans die every day from an opioid overdose.

Opioid dependence impacts the drug user and imposes a significant economic burden on society by increasing health care costs, unemployment rates absenteeism, and premature mortality. OUD currently costs the United States tens of billions of dollars annually, not only in health-care expenses but also in the form of a weakened workforce. The economic cost of the country's opioid epidemic in 2017 was estimated at $1,021 billion, including cost of opioid use disorder estimated at $471 billion and cost of fatal opioid overdose estimated at $550 billion. The crisis has reached such an enormous scale that it has become a drag on the economy and a threat to national security Opioid cessation through discontinuation and abstinence are the first steps in the treatment of OUD and almost always results severe flu-like symptoms that are collectively referred to as Opioid Withdrawal Syndrome ("OWS"). Shigakova F. "*Clinical manifestations of the opiate withdrawal syndrome.*" Int J Biomed. 2015; 5(3):151-154. Symptoms of OWS include aches and pains, abdominal cramps, feeling sick (nausea, vomiting, diarrhea), muscle spasms/twitching, severe irritability, insomnia/problems sleeping, feelings of coldness/chills, tremors, dyskinesia, heart pounding, runny eyes, and severe anxiety. Vernon M K, Reinders S, Mannix S, et al. "*Psychometric evaluation of the* 10-*item Short Opiate Withdrawal Scale-Gossop* (*SOWS-Gossop*) *in patients undergoing opioid detoxification.*" Addict Behav. 2016 60:109-116. Although conventionally considered non-life threatening, the clinical manifestations of opioid withdrawal can lead to severe fluid loss and electrolyte abnormalities that result in hemodynamic instability and death.

These symptoms can show up within twelve hours after you take the last dose of the drug and can be extremely agonizing and uncomfortable so many people continue taking these drugs. Physical dependence is responsible for the distressing withdrawal symptoms individuals experience upon abrupt cessation or rapid dose reduction of exogenous opioids. In other words, OWS is a key driver behind continued opioid use, and is a significant barrier to opioid discontinuation. Indeed, research has shown that the fear and avoidance of the withdrawal symptoms is the foremost reason patients who began taking opioids for pain relief continued to use them. According to a survey of patients with chronic pain, those who initially took opioids for pain were more than twice as likely to continue taking opioids to avoid physical withdrawal (57%), rather than needing pain relief (23%), or wanting to "get high" (14%).

Opioid dependence causes the user to experience cravings for the drug. The severity and intensity of the drug cravings are, generally, directly related to the user's degree of dependence. These cravings are a Pavlovian response to an external stimulus such as a person, place, smell or action. For example, if a user took opioids when he watched football games on television, the actions become paired such that a football game on television would cause him to have a craving for the opioids. This phenomenon is often referred to as a "paired action" and is one of the most common causes of a relapse. Real-time daily monitoring of craving and drug use has shown that craving reliably predicts relapse among dependent individuals. The data suggest that improving the treatment of craving could not only help prevent relapse, but could also reduce patient distress on the emotional, cognitive, and physiological levels.

First-line treatment for patients with OUD most commonly consists of pharmacotherapy with an opioid agonist or antagonist and adjunct psychosocial treatment. Current standards of care include medications for opioid use disorder (MOUD)—either partial (buprenorphine) or full (methadone) μ-opioid receptor agonists, or antagonist treatment, namely, monthly, injectable extended-release naltrexone. Though not a cure for addiction, these prescription medications block the opioid receptors in the brain that crave opioids which causes the brain to stop sending signals that manifest as withdrawal symptoms and cravings for opioids. These medications are prescribed to diminish withdrawal symptoms and cravings for opioids and are used to wean or taper individuals off the opioids. These medications, however, carry a stigma as well as their own addiction risk, are mired in tight governmental regulation, and therefore are underutilized by the millions of people diagnosed with opioid use disorder.

Discontinuation of the problematic opioid often results in severe OWS, creating a barrier to opioid cessation and further OUD treatment. Effective treatment of OWS is a crucial first step on the pathway to successful OUD treatment. During detox, medications can be used to help you get through opioid withdrawal safely and with as little discomfort as possible. Although opioid agonist therapy (OAT) (e.g., methadone or buprenorphine) treatment for OWS is desirable for many patients, non-opioid treatments are needed in a variety of situations that are not favorable for OAT or when OAT is inadequate alone.

The current state of the art does not adequately address all the aspects of the opioid addiction cycle—including progression to chronic use, withdrawal symptoms, craving, relapse, and overdose. The treatment gaps in curbing, moderating and/or lessening the symptoms of OWS highlight the urgent need to develop novel therapeutic strategies to target the agonizing symptoms of OWS and to reduce the subsequent drug cravings. Concomitant use of non-opioid medications during buprenorphine induction is frequently underused to ameliorate any buprenorphine precipitated OWS.

It is critical to minimize OWS during early opioid withdrawal as patients are medically and emotionally fragile and have a limited alliance with the treater leading to drop out of treatment at the time. Effective treatment of OWS is a crucial first step on the pathway to successful withdrawal from opioids, which indicates that is a need for a comprehensive solution for a supportive medication to target and minimize, and/or curb the residual symptoms of opioid withdrawal.

SUMMARY OF THE INVENTION

The present disclosure relates to a comprehensive composition and method for preventing and/or moderating and/or curbing the deleterious symptoms of opioid withdrawal syndrome, that includes (i) a therapeutically effective amount of a functional blend comprising a mixture of cannabidiol, cannabigerol, gamma aminobutyric acid, Inositol, and Vitamin B-12; (ii) a therapeutically effective amount of a hydration blend comprising a mixture of calcium, magnesium, potassium citrate, and L-glutamine; (iii) a therapeutically effective amount of an anti-inflammatory blend comprising a mixture of turmeric, green tea, and passion fruit; and (iv) a therapeutically effective amount of a neurotransmitter blend comprising 5-hydroxy-L-Tryptophan, N-acetyl L-Tyrosine, and L-Phenylalanine.

In one embodiment, the amount of the functional blend in the composition is about 225 mg.

In another embodiment, the amount of cannabidiol in the composition is about 100 mg, the amount of cannabigerol in the composition is about 25 mg, the amount of gamma aminobutyric acid in the composition is about 50 mg, the amount of Inositol in the composition is about 25 mg, and the amount of Vitamin B-12 in the composition is about 25 mg.

In another embodiment, the amount of the hydration blend in the composition is about 100 mg.

In another embodiment, the amount of calcium in the composition is about 25 mg, the amount of magnesium in the composition is about 25 mg, the amount of potassium citrate in the composition is about 25 mg, and the amount of L-glutamine in the composition is about 25 mg.

In another embodiment, the amount of the anti-inflammatory blend in the composition is about 75 mg.

In another embodiment, the amount of turmeric in the composition is about 25 mg, the amount of green tea in the composition is about 25 mg, and the amount of passion fruit in the composition is about 25 mg.

In another embodiment, the amount of the neurotransmitter blend in the composition is about 75 mg.

In another embodiment, the amount of 5-hydroxy-L-Tryptophan in the composition is about 25 mg, the amount of N-acetyl L-Tyrosine in the composition is about 25 mg, and the amount of L-Phenylalanine in the composition is about 25 mg.

In another embodiment, the amount of the functional blend is about 47% of the composition by weight, the amount of the hydration blend is about 21% of the composition by weight, the amount of the anti-inflammatory blend is about 15-16% of the composition by weight, and the amount of the neurotransmitter blend is about 15-16% percent of the composition by weight.

In another embodiment, the composition includes a sleep blend comprising a therapeutically effective amount of melatonin, cannabinol and/or diphenhydramine.

In accordance with embodiments of the invention, a method of preventing or treating opioid withdrawal syndrome in a human is provided. The method may include administering the composition as described above to the human in the form of a capsule, pill, liquid, powder for mixing, or patch.

In one embodiment of the method, the amount of the functional blend in the composition is about 225 mg.

In another embodiment of the method, the amount of cannabidiol in the composition is about 100 mg, the amount of cannabigerol in the composition is about 25 mg, the amount of gamma aminobutyric acid in the composition is about 50 mg, the amount of Inositol in the composition is about 25 mg, and the amount of Vitamin B-12 in the composition is about 25 mg.

In another embodiment of the method, the amount of the hydration blend in the composition is about 100 mg.

In another embodiment of the method, the amount of calcium in the composition is about 25 mg, the amount of magnesium in the composition is about 25 mg, the amount of potassium citrate in the composition is about 25 mg, and the amount of L-glutamine in the composition is about 25 mg.

In another embodiment of the method, the amount of the anti-inflammatory blend in the composition is about 75 mg.

In another embodiment of the method, the amount of turmeric in the composition is about 25 mg, the amount of green tea in the composition is about 25 mg, and the amount of passion fruit in the composition is about 25 mg.

In another embodiment of the method, the amount of the neurotransmitter blend in the composition is about 75 mg.

In another embodiment of the method, the amount of 5-hydroxy-L-Tryptophan in the composition is about 25 mg, the amount of N-acetyl L-Tyrosine in the composition is about 25 mg, and the amount of L-Phenylalanine is about 25 mg.

In another embodiment of the method, the amount of the functional blend in the composition is about 47% of the composition by weight, the amount of the hydration blend in the composition is about 21% of the composition by weight, the amount of the anti-inflammatory blend in the composition is about 15-16% of the composition by weight, and the amount of the neurotransmitter blend in the composition is about 15-16% percent of the composition by weight.

DETAILED DESCRIPTION OF THE DISCLOSURE

The following more detailed description of the embodiments of the composition and method of the disclosure is not intended to limit the scope of the disclosure, as claimed, but is merely representative of possible embodiments of the disclosure.

Embodiments of the invention provide a novel and comprehensive move towards a solution to the adverse and undesirable symptoms of opioid withdrawal. The present disclosure provides a novel and comprehensive solution to the negative symptoms of opioid withdrawal syndrome. This disclosure contemplates a composition containing a mixture of cannabidiol (CBD) and other chemicals, vitamins, and nutrients that is formulated to target, moderate and/or curb the deleterious symptoms of opioid withdrawal syndrome. Moreover, the disclosure contemplates a composition containing a mixture of cannabidiol (CBD) and other chemicals, vitamins, and nutrients that is specifically formulated to target, moderate and/or curb the that the cue induced drug cravings and the associated stress and anxiety.

As used herein, the term "opioid" refers to any agent that activates opioid receptors. Examples of opioids include endogenous opioid peptides, opium alkaloids (e.g., morphine), semi-synthetic opioids (e.g., heroin), and fully synthetic opioids (e.g., fentanyl). Term "opioid withdrawal syndrome" refers to a syndrome characterized by signs and symptoms that appear when an opioid that causes physical dependence is regularly used for a long time and then suddenly discontinued or decreased in dosage. Such signs and symptoms may include, but are not limited to, sweating, malaise, anxiety, depression, persistent and intense penile erection in males (priapism), extra sensitivity of the genitals in females, general feeling of heaviness, cramp-like pains in the limbs, yawning and lacrimation, sleep difficulties, cold sweats, chills, severe muscle and bone aches not precipitated by any physical trauma, nausea and vomiting, diarrhea, goose bumps, cramps, fever, painful conditions, muscle spasms in the legs of the user (restless leg syndrome). The term "antagonist" refers to a molecule that prevents the activation of a receptor.

Term "peripherally restricted antagonist of opioid receptors" refers to a molecule that prevents the activation of peripheral opioid receptors and does not prevent the activation of central opioid receptors. Nonexclusive examples of opioid receptors include μ (mu), K (kappa), and δ (delta) opioid receptors.

The composition contains a therapeutically effective amount of CBD immixed with four specific compositions or blends (e.g., a therapeutically effective amount of (i) a functional mix/composition, (ii) a hydration mix/composition, (iii) an anti-inflammatory mix/composition, and (iv) a neurotransmitter mix/composition) that work conjunctively to relieve and/or ameliorate the causes and symptoms of opioid withdrawal syndrome. The main or hero ingredient of the composition is CBD, which addresses the majority of the deleterious effects and/or symptoms of opioid withdrawal syndrome, and which addresses the cue induced drug cravings and related anxiety and stress.

The functional composition contains Cannabidiol (CBD), Cannabigerol (CBG), Gamma Aminobutyric Acid (GABA), Inositol, and Vitamin B-12. The functional blend targets the nerves with a calming effect for reducing anxiety, stress, fear, obsessive-compulsive behavior.

The hydration composition contains Calcium, Magnesium, Potassium Citrate, and L-glutamine. The hydration blend contains specific electrolytes that are targeted to help with better sleep, nerve health, nerve transmission, and/or better sleep. The L-Glutamine is an amino acid that may help with brain health and detoxification of the liver.

The anti-inflammatory composition contains, Turmeric, Green Tea, and Passion Fruit. The anti-inflammatory blend contains antioxidants that help to repair cellular damage. These antioxidants may help improve the symptoms of depression and arthritis and may help to improve brain function.

The neurotransmitter composition contains 5-hydroxy-L-Tryptophan (5htp), N-acetyl L-Tyrosine, and L-Phenylalanine. The neurotransmitter blend contains amino acids that help to increase serotonin levels in the brain which helps to regulate mood and behavior that are helpful in maintaining cognitive performance under practically any kind of stress by potentiating increases in extracellular dopamine and that are helpful in the body's production of the neurotransmitter norepinephrine, which has many important functions, including helping signals travel between the brain and the body's nerve cells, maintaining an awake or alert state, improving memory, reducing hunger pains, and also has antidepressant properties.

The composition can be made as a capsule, a pill, a powder for mixing, a liquid (e.g., a liquid shot), or a patch designed to be temporarily affixed to the skin for transdermal migration. The capsule delivery system may contain a powder or liquid form of each substance. The capsules are to be taken orally with water. To administer to the composition in one embodiment, an individual experiencing opioid withdrawal syndrome would take a capsule one or more times during the day and take a liquid, such as a tincture, before bed. The capsule would alleviate/ameliorate the cravings and other symptoms of withdrawal during the day and the tincture would alleviate/ameliorate the symptoms at night by causing the individual to better uninterrupted sleep. To aid in sleeping, a therapeutic amount of melatonin and/or therapeutic amount of cannabinol (CBN) and/or a therapeutic amount of diphenhydramine may be added to the liquid. Any combination of delivery mechanisms may be utilized depending on preferences of the individual. In one embodiment, doses of the composition are given throughout the day in intervals such as 4 hours, 6 hours, 12 hours, or in the morning and/or before bed, for example.

One embodiment of the composition of the present disclosure contains the following compounds in the following amounts:

| Compound/Blend | CAS No. | Amount |
|---|---|---|
| Functional Blend: | | |
| Cannabidiol (CBD) | 13956-29-1 | 100 mg |
| Cannabigerol (CBG) | 25654-31-3 | 25 mg |
| Gamma Aminobutyric Acid (GABA) | 56-12-2 | 50 mg |
| Inositol | 87-89-8 | 25 mg |
| Vitamin B-12 | 68-19-9 | 25 mg |
| Hydration Blend | | |
| Calcium | 7440-70-2 | 25 mg |
| Magnesium | 7439-95-4 | 25 mg |
| Potassium Citrate | 6100-05-6 | 25 mg |
| L-glutamine | 56-85-9 | 25 mg |
| Anti-Inflammatory Blend | | |
| Turmeric 25 mg | 458-37-7 | 25 mg |
| Green Tea 25 mg | 84650-60-2 | 25 mg |
| Passion Fruit | 91770-48-8 | 25 mg |
| Neurotransmitter Blend | | |
| 5-hydroxy-L-Tryptophan (5htp) | 4350-09-8 | 25 mg |
| N-acetyl L-Tyrosine | 537-55-3 | 25 mg |
| L-Phenylalanine | 63-91-2 | 25 mg |

The composition is formulated by mixing the compounds listed above and encapsulating the composition into a single dose capsule, tincture and/or transdermal patch. In one embodiment, each dose contains the listed amount of each compound. Accordingly, the preferred dose of this embodiment of the composition (i.e., 1-2 capsules) includes about 225-450 mg of the functional blend, about 100-200 mg of the hydration blend, about 75-150 mg of the anti-inflammatory blend, and about 75-150 mg of the neurotransmitter blend. More specifically, the amount of cannabidiol in the composition is about 100-200 mg, the amount of cannabigerol in the composition is about 25-50 mg, the amount of gamma aminobutyric acid in the composition is about 50-100 mg, the amount of Inositol in the composition is about 25-50 mg, the amount of Vitamin B-12 in the composition is about 25-50 mg, the amount of calcium in the composition is about 25-50 mg, the amount of magnesium in the composition is about 25-50 mg, the amount of potassium citrate in the composition is about 25-50 mg, the amount of L-glutamine in the composition is about 25-50 mg, the amount of turmeric in the composition is about 25-50 mg, the amount of green tea in the composition is about 25-50 mg, the amount of passion fruit in the composition is about 25-50 mg, the amount of 5-hydroxy-L-Tryptophan in the composition is about 25-50 mg, the amount of N-acetyl L-Tyrosine in the composition is about 25-50 mg, and the amount of L-Phenylalanine in the composition is about 25-50 mg.

In another embodiment, the composition of the present disclosure comprises amount of the functional blend is about 47% of the composition by weight, the amount of the hydration blend is about 21% of the composition by weight, the amount of the anti-inflammatory blend is about 15-16% of the composition by weight, and the amount of the neurotransmitter blend is about 15-16% percent of the composition by weight.

The synergistic effect between the CBD and the other substances, vitamins and nutrients in the present disclosure provide a significant improvement over the state of the art for targeting and/or treating and/or managing the deleterious symptoms of opioid withdrawal, particularly in light of the fact that CBD can reduce the cue induced drug cravings.

Cannabidiol is a natural analgesic, antiemetic, and neuroprotectant. CBD relieves and ameliorates anxiety, digestive issues, depression, seizures and tremors, inflammation, irritable bowel syndrome, kidney disease, liver disease, migraine headaches, mood disorders, motion sickness, nausea, neurodegeneration, chronic pain, PTSD, sleep disorders and recovery from traumatic brain injuries. CBD is also a powerful antioxidant. As such, cannabidiol address most of the symptoms of opioid withdrawal syndrome: aches and pains, abdominal cramps, general malaise-nausea, vomiting, diarrhea, muscle spasms/twitching, severe irritability, insomnia, problems sleeping, feelings of coldness/chills, tremors, dyskinesia, heart pounding, runny eyes, and severe anxiety. The fact that patients with substance use disorders often present with various psychiatric and medical symptoms that are reduced by CBD—symptoms such as anxiety, mood symptoms, insomnia, and pain—also suggests that CBD might be beneficial for treating opioid-dependent individuals. Hurd, Yoon, Manini, *Early Phase in the Development of Cannabidiol as a Treatment for Addiction: Opioid Relapse Takes Initial Center Stage*, Neurotherapeutics. 2015 October; 12(4): 807-815. Published online 2015 Aug. 13. doi: 10.1007/s13311-015-0373-7.

CBD has been shown to have anxiolytic, antipsychotic, and antidepressant properties. CBD also exhibits neuroprotective actions, mainly due to its anti-inflammatory and antioxidant properties. CBD further substantially limits neuronal damage to hippocampal and entorhinal cortical brain regions. Another possibility is that it affects how brain cells that have been damaged by opioids communicate with each other.

CBD is an option as an adjunct for the treatment of symptoms of OWS based on its anxiolytic, antidepressant, antipsychotic, and neuroprotective properties. CBD could also decrease cravings and anxiety, common symptoms of opioid withdrawal. At least one study, has found that CBD specifically attenuated heroin-seeking behavior reinstated by a conditional stimulus and that it had a protracted effect with significance after twenty-four hours and even two weeks after administration. Ren, Whittard, Morris, Hurd, *Cannabidiol, a Nonpsychotropic Component of Cannabis, Inhibits Cue-Induced Heroin Seeking and Normalizes Discrete Mesolimbic Neuronal Disturbances*, The Journal of Neuroscience, Nov. 25, 2009; 29(47):14764-14769.

Altogether, CBD has been associated with many neural circuits involved in the acquisition of addiction and subsequent drug-seeking behaviors, making it an interesting candidate for an adjunct for targeting and/or treating and/or managing the deleterious symptoms of opioid withdrawal.

The benefit of CBD in addressing, curbing and moderating the deleterious symptoms of opioid withdrawal syndrome is enhanced by the numerous other specific substances contained in the functional blend, the hydration blend, the anti-inflammatory blend and the neurotransmitter blend.

With respect to the functional blend:

Gamma aminobutyric acid (GABA) is a naturally occurring amino acid that works as a neurotransmitter in the brain. Neurotransmitters function as chemical messengers. GABA is considered an inhibitory neurotransmitter because it blocks, or inhibits, certain brain signals and decreases activity in the nervous system. When GABA attaches to a protein in the brain known as a GABA receptor, it produces a calming effect. GABA can help with feelings of anxiety, stress, and fear. It may also help to prevent seizures. Similarly, inositol has been found to balance certain chemicals in the body to help with mental conditions such as panic disorder, depression and obsessive-compulsive disorder. Accordingly, these substances work with the CBD and CBG to reduce and/or curb and/or ameliorate to reduce the drug cravings and the stress and anxiety that is commonly experienced with opioid withdrawal.

With respect to the hydration blend:

The composition of the present disclosure contains several minerals and amino acids, including but not limited to potassium citrate, magnesium, calcium, and L-glutamine. These minerals and amino acids specifically target specific symptoms or opioid withdrawal syndrome by promoting and/or assisting with circulation, nerve health, improved mood, lower blood pressure, heart function, brain health, and/or detoxification of the liver. In one embodiment, the minerals and amino acids contained in the hydration blend comprise potassium citrate, magnesium, calcium and L-glutamine.

With respect to the anti-inflammatory blend:

The composition of the present disclosure contains several potent antioxidants, anti-inflammatories, and vitamins, including but not limited to turmeric, green tea extract and passion fruit. These potent antioxidants, anti-inflammatories, and vitamins may help improve the symptoms of depression, body aches and muscular tension. For example, passion fruit is full of antioxidants, such as vitamin C, which the body uses to make blood vessels, cartilage, muscles, and collagen. It also helps your body heal, lowers inflammation, and protects cells from damage from free radicals. In one embodiment, the disclosure contains several potent antioxidants, anti-inflammatories, and vitamins contained in the anti-inflammatory blend comprise turmeric, green tea extract and passion fruit.

With response to the neurotransmitter blend:

The composition of the present disclosure contains several amino acids, including but not limited to 5-hydroxy-L-tryptophan, N-acetyl L-Tyrosine and L-Phenylalanine. This composition specifically contains 5-hydroxy-L-tryptophan because it helps to raise serotonin levels in the brain. Since, serotonin helps regulate mood and behavior, 5-hydroxy-L-tryptophan may have a positive effect on sleep, mood, anxiety, and depression. This composition specifically contains N-acetyl L-Tyrosine because it can be a highly effective nootropic for boosting cognitive function and has been found to be helpful in maintaining cognitive performance when you're under practically any kind of stress. This composition specifically contains L-Phenylalanine because the body uses it to produce the neurotransmitter norepinephrine, which has many important functions, which include but are not limited to, helping signals travel between the brain and the body's nerve cells, maintaining an awake or alert state, improving memory, reducing hunger pains, and has been found to have antidepressant properties. The synergy of these amino acids assists in the stress and anxiety that are paramount with opioid cessation and abstinence. In one embodiment, the disclosure contains several amino acids contained in the neurotransmitter blend comprise 5-hydroxy-L-tryptophan, N-acetyl L-Tyrosine and L-Phenylalanine.

In one embodiment of the method, the composition may include a sleep blend of a therapeutically effective amount of melatonin and/or cannabinol and/or diphenhydramine. The sleep blend is operable for use at night to help assist and promote continued and uninterrupted sleep.

Every component of the composition of the present disclosure was specifically included to provide a benefit regardless of whether the individual has all the symptoms of opioid withdrawal syndrome. For example, CBD has been found to independently provide a plethora of health benefits.

The composition of the present disclosure may comprise any combination of the described compounds and blends. Each method described may include any combination of the described steps in any order, including the absence of certain described steps and combinations of steps used in separate embodiments. Any range of numeric values disclosed herein shall be construed to include any subrange therein.

While preferred embodiments have been described, it is to be understood that the embodiments described are illustrative only and that the scope of the invention is to be defined solely by the appended claims when accorded a full range of equivalents, many variations and modifications naturally occurring to those skilled in the art from a review hereof.

For the purposes of promoting an understanding of the principles of the invention, reference has been made to the preferred embodiments, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A composition for curbing, reducing, and lessening the symptoms of opioid withdrawal syndrome, comprising:
    a therapeutically effective amount of a functional blend comprising a mixture of cannabidiol, cannabigerol, gamma aminobutyric acid, inositol, and vitamin B-12;
    a therapeutically effective amount of a hydration blend comprising a mixture of calcium, magnesium, potassium citrate, and L-glutamine;
    a therapeutically effective amount of an anti-inflammatory blend comprising a mixture of turmeric, green tea, and passion fruit; and
    a therapeutically effective amount of a neurotransmitter blend comprising 5-hydroxy-L-tryptophan, N-acetyl L-tyrosine, and L-phenylalanine;
    wherein the amount of said functional blend is about 47% of the composition by weight, the amount of said hydration blend is about 21% of the composition by weight, the amount of said anti-inflammatory blend is about 15-16% of the composition by weight, and the amount of said neurotransmitter blend is about 15-16% of the composition by weight.

2. The composition of claim 1, wherein the amount of the functional blend is about 225 mg.

3. The composition of claim 1, wherein the amount of cannabidiol is about 100 mg, the amount of cannabigerol is about 25 mg, the amount of gamma aminobutyric acid is about 50 mg, the amount of inositol is about 25 mg, and the amount of vitamin B-12 is about 25 mg.

4. The composition of claim 1, wherein the amount of the hydration blend is about 100 mg.

5. The composition of claim 1, wherein the amount of calcium is about 25 mg, the amount of magnesium is about 25 mg, the amount of potassium citrate is about 25 mg, and the amount of L-glutamine is about 25 mg.

6. The composition of claim 1, wherein the amount of the anti-inflammatory blend is about 75 mg.

7. The composition of claim 1, wherein the amount of turmeric is about 25 mg, the amount of green tea is about 25 mg, and the amount of passion fruit is about 25 mg.

8. The composition of claim 1, wherein the amount of the neurotransmitter blend is about 75 mg.

9. The composition of claim 1, wherein the amount of 5-hydroxy-L-tryptophan is about 25 mg, the amount of N-acetyl L-tyrosine is about 25 mg, and the amount of L-phenylalanine is about 25 mg.

10. The composition of claim 1, further comprising a sleep blend comprising a therapeutically effective amount of melatonin, cannabinol and/or diphenhydramine.

11. A method of preventing or treating opioid withdrawal syndrome in a human comprising the steps of: a) administering the composition of claim 1 to the human in the form of a capsule, pill, liquid, powder for mixing, or patch.

12. The method of claim 11, wherein the amount of the functional blend is about 225 mg.

13. The method of claim 11, wherein the amount of cannabidiol is about 100 mg, the amount of cannabigerol is about 25 mg, the amount of gamma aminobutyric acid is about 50 mg, the amount of inositol is about 25 mg, and the amount of vitamin B-12 is about 25 mg.

14. The method of claim 11, wherein the amount of the hydration blend is about 100 mg.

15. The method of claim 11, wherein the amount of calcium is about 25 mg, the amount of magnesium is about 25 mg, the amount of potassium citrate is about 25 mg, and the amount of L-glutamine is about 25 mg.

16. The method of claim 11, wherein the amount of the anti-inflammatory blend is about 75 mg.

17. The method of claim 11, wherein the amount of turmeric is about 25 mg, the amount of green tea is about 25 mg, and the amount of passion fruit is about 25 mg.

18. The method of claim 11, wherein the amount of the neurotransmitter blend is about 75 mg.

19. The method of claim 11, wherein the amount of 5-hydroxy-L-tryptophan is about 25 mg, the amount of N-acetyl L-tyrosine is about 25 mg, and the amount of L-phenylalanine is about 25 mg.

20. The method of claim 11, wherein the amount of said functional blend is about 47% of the composition by weight, the amount of said hydration blend is about 21% of the composition by weight, the amount of said anti-inflammatory blend is about 15-16% of the composition by weight, and the amount of said neurotransmitter blend is about 15-16% percent of the composition by weight.

* * * * *